(12) United States Patent
Helferty

(10) Patent No.: US 7,621,373 B2
(45) Date of Patent: Nov. 24, 2009

(54) ACOUSTIC DRAIN

(75) Inventor: Raymond D. Helferty, Chesterfield Township, MI (US)

(73) Assignee: Sika Technology AG, Baar (CH)

( * ) Notice: Subject to any disclaimer, the term of this patent is extended or adjusted under 35 U.S.C. 154(b) by 319 days.

(21) Appl. No.: 11/012,656

(22) Filed: Dec. 15, 2004

(65) Prior Publication Data

US 2006/0124386 A1    Jun. 15, 2006

(51) Int. Cl.
B60R 13/07    (2006.01)
(52) U.S. Cl. .................. 181/268; 181/264; 181/270; 181/275; 181/282; 296/208
(58) Field of Classification Search .............. 296/208; 181/264, 268, 270, 275, 282
See application file for complete search history.

(56) References Cited

U.S. PATENT DOCUMENTS

| | | | |
|---|---|---|---|
| 3,143,373 A | | 8/1964 | Fordyce |
| 3,153,579 A | * | 10/1964 | Levey et al. ............... 422/169 |
| 3,606,446 A | | 9/1971 | Leslie |
| 3,701,560 A | | 10/1972 | Emmerson |
| 3,711,147 A | | 1/1973 | Higuchi et al. |
| 4,071,273 A | | 1/1978 | Hack et al. |
| 4,093,038 A | * | 6/1978 | Molin ..................... 180/271 |
| 4,216,707 A | | 8/1980 | Pennington |
| 4,415,278 A | * | 11/1983 | Szonntagh ................. 374/37 |
| 4,480,591 A | * | 11/1984 | Deckers ................... 122/18.1 |
| 4,747,636 A | * | 5/1988 | Harasaki et al. .......... 296/181.4 |
| 5,005,553 A | * | 4/1991 | Washizu et al. ............ 123/572 |
| 5,159,789 A | | 11/1992 | Haapanen |
| 5,295,785 A | * | 3/1994 | Church et al. ............. 415/58.3 |
| 5,344,208 A | | 9/1994 | Bien et al. |
| 5,399,064 A | * | 3/1995 | Church et al. ............. 415/58.3 |
| 5,482,343 A | | 1/1996 | Bradac |
| 5,506,025 A | | 4/1996 | Otto et al. |
| 5,642,914 A | | 7/1997 | Takabatake |
| 5,725,272 A | * | 3/1998 | Jones ..................... 296/208 |
| 5,844,336 A | * | 12/1998 | Ohya et al. ................ 310/80 |
| 5,931,474 A | | 8/1999 | Chang et al. |
| 5,979,902 A | | 11/1999 | Chang et al. |
| 6,082,809 A | | 7/2000 | Edgeller et al. |
| 6,114,004 A | | 9/2000 | Cydzik et al. |
| D437,259 S | | 2/2001 | Edgeller et al. |
| D437,260 S | | 2/2001 | Edgeller et al. |
| D437,806 S | | 2/2001 | Edgeller et al. |
| 6,263,635 B1 | | 7/2001 | Czaplicki |
| 6,296,298 B1 | | 10/2001 | Barz |
| 6,311,452 B1 | | 11/2001 | Barz et al. |
| 6,321,793 B1 | | 11/2001 | Czaplicki et al. |
| 6,358,584 B1 | | 3/2002 | Czaplicki |

(Continued)

FOREIGN PATENT DOCUMENTS

WO    WO 97/49598    12/1997

(Continued)

*Primary Examiner*—Lincoln Donovan
*Assistant Examiner*—Jeremy Luks
(74) *Attorney, Agent, or Firm*—Rader, Fishman & Grauer PLLC

(57) ABSTRACT

A baffle assembly for a hollow cavity is disclosed. The baffle assembly includes a labyrinth that defines a tortuous drain passageway. The baffle assembly includes a vertical portion that abuts an expandable material to reduce the transmission of noise and other vibrations.

11 Claims, 5 Drawing Sheets

U.S. PATENT DOCUMENTS

| | | |
|---|---|---|
| 6,368,438 B1 | 4/2002 | Chang et al. |
| 6,383,610 B1 | 5/2002 | Barz et al. |
| 6,387,470 B1 | 5/2002 | Chang et al. |
| 6,422,575 B1 | 7/2002 | Czaplicki et al. |
| 6,467,834 B1 | 10/2002 | Barz et al. |
| 6,471,285 B1 | 10/2002 | Czaplicki et al. |
| 6,474,723 B2 | 11/2002 | Czaplicki et al. |
| 6,482,486 B1 | 11/2002 | Czaplicki et al. |
| 6,520,505 B1 | 2/2003 | Kogler et al. |
| 6,523,884 B2 | 2/2003 | Czaplicki et al. |
| 6,561,571 B1 | 5/2003 | Brennecke |
| 6,575,526 B2 | 6/2003 | Czaplicki et al. |
| 6,619,727 B1 | 9/2003 | Barz et al. |
| 6,641,208 B2 | 11/2003 | Czaplicki et al. |
| 6,668,457 B1 | 12/2003 | Czaplicki |
| 6,669,525 B2 * | 12/2003 | Farrah et al. ............... 445/60 |
| 6,679,742 B2 * | 1/2004 | Yokoya et al. ............ 440/89 J |
| 6,880,657 B2 * | 4/2005 | Schneider et al. ......... 180/68.5 |
| 2002/0104908 A1 | 8/2002 | Berger et al. |
| 2002/0174954 A1 | 11/2002 | Busseuil et al. |
| 2003/0141231 A1 * | 7/2003 | Rattenbury et al. ......... 210/163 |

FOREIGN PATENT DOCUMENTS

| | | |
|---|---|---|
| WO | WO 03/000535 A1 | 1/2003 |

* cited by examiner

ACOUSTIC DRAIN

BACKGROUND

Various products have bodies or housings with hollow cavities therein. For example, automobiles, trucks and other vehicles, as well as some consumer appliances have hollow cavities formed between inner and outer panels that form their respective bodies or housings. In many instances, those cavities are sealed or sectioned off to prevent or minimize the transmission of noise therethrough. It is known to use an acoustic baffle to completely seal or partition portions of hollow cavities. These baffles effectively minimize noise transmission. However, sometimes, various fluids can accumulate in the hollow cavities. When that occurs it may be desirable in certain applications for the fluid to drain out of the hollow cavity so as to prevent or minimize the potential for corrosion or other undesirable effects of the trapped fluid. Many conventional acoustic baffles do not include a mechanism to allow trapped fluid to escape the hollow cavity through the baffle.

The embodiments described herein were developed in light of these and other drawbacks associated with conventional acoustic baffles.

SUMMARY

In one embodiment, a baffle assembly includes a substantially planar carrier having an upper surface and a lower surface, and a drain housing extending from said upper surface, wherein said drain housing includes a cavity interconnecting a fluid inlet and a fluid outlet, and a generally vertically oriented web portion that extends from an interior surface of the drain housing to define at least a portion of a drain path through said cavity.

In a further embodiment, a drain housing for dissipating sound therein includes a generally vertically oriented planar web portion that extends from an interior surface of said drain housing to define at least a portion of a drain path through said drain housing, wherein said web portion defines two legs of said drain path, wherein said two legs of said drain path flow in opposite directions.

In yet a further embodiment, a method of reducing noise propagation through a partially enclosed cavity includes positioning a baffle assembly in a desired location within the partially enclosed cavity, wherein said baffle assembly includes a fluid inlet, positioning an expandable material adjacent said baffle assembly, and expanding said expandable material such that said expandable material at least partially encloses said baffle assembly.

BRIEF DESCRIPTION OF THE DRAWINGS

Embodiments of the present invention will now be described, by way of example, with reference to the accompanying drawings, in which.

DETAILED DESCRIPTION

Figure 1:
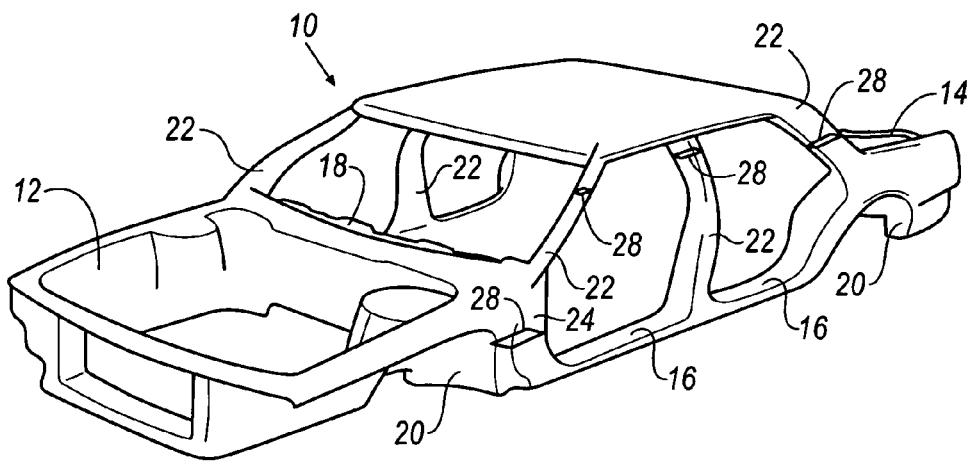
FIG. 1 is a perspective view of an automobile body, illustrating various pillars within which an acoustic baffle apparatus incorporates a drain assembly in accordance with an embodiment of the present invention.
Figure 2:
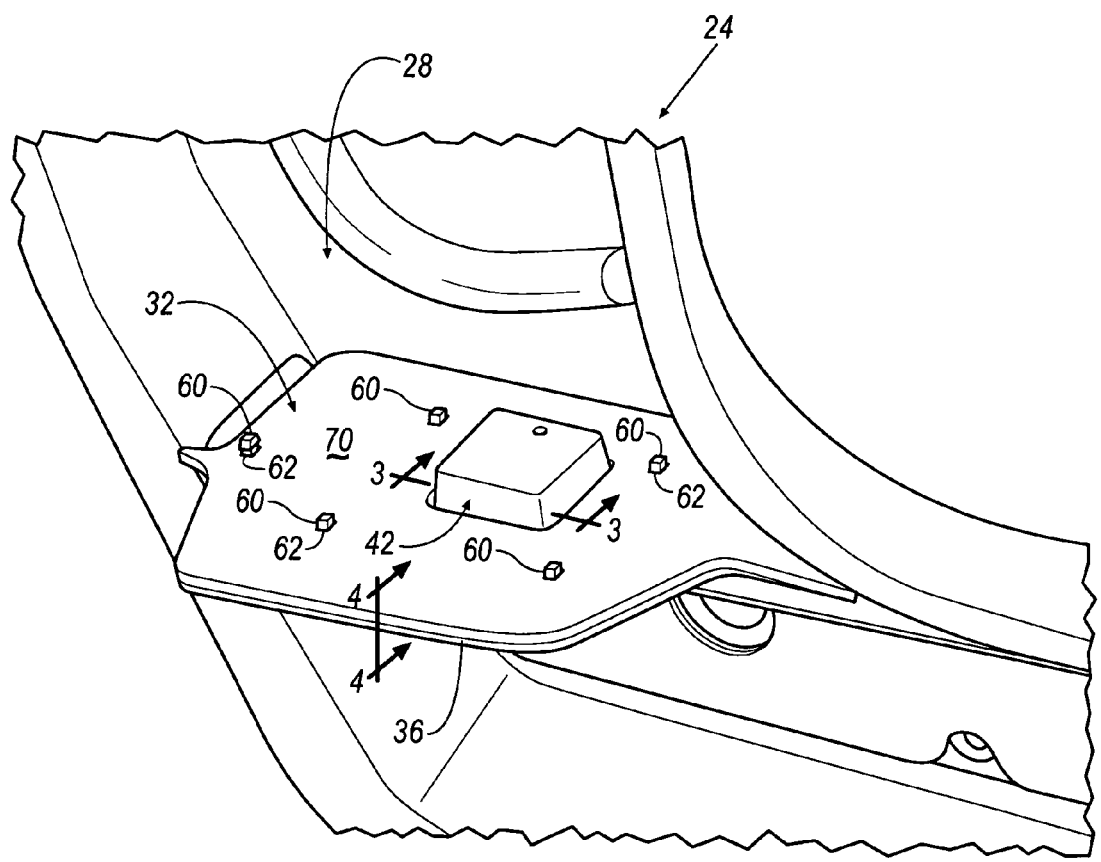
FIG. 2 is a perspective view of an embodiment of a baffle assembly in accordance with the present invention.
Figure 3:
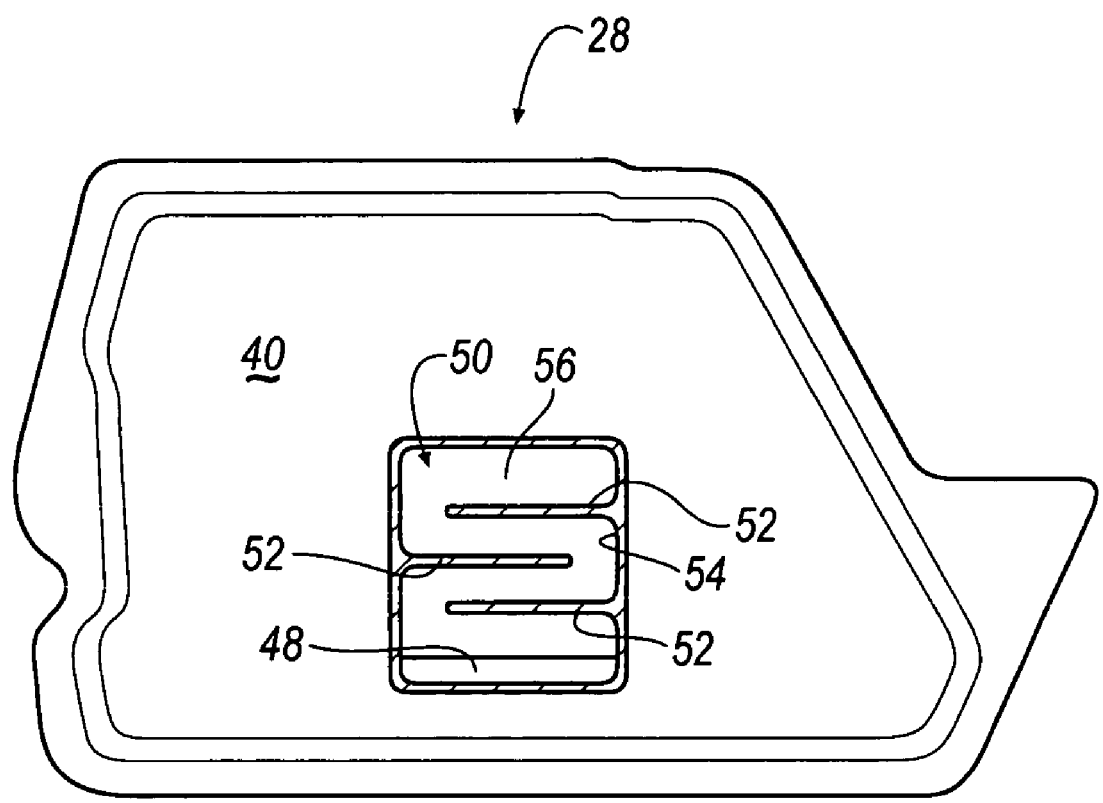
FIG. 3 is a sectional view taken along line 3-3 of FIG. 2, with the sealing material removed for clarity.

An automobile body 10 is illustrated in FIG. 1. The automobile body 10 has several interconnected, frame elements that define an engine compartment 12, trunk 14, doorways 16, firewall 18, wheel wells 20, structural pillars 22, and rocker panels 24. Acoustic drains, or baffle assemblies, 28 are illustrated within pillars 22 and rocker panels 24. Pillars 22 and rocker panels 24 are examples of hollow cavities in which the embodiments of the baffle assembly 28 described below can be used. Moreover, though the baffle assembly 28 is described herein in the context of an automobile, it is understood that the described baffle assembly 28 can also be used in connection with a variety of other articles of manufacture to generally seal or section off hollow cavities to minimize noise transmission, while at the same time permitting the passage of fluid.

Figure 4:
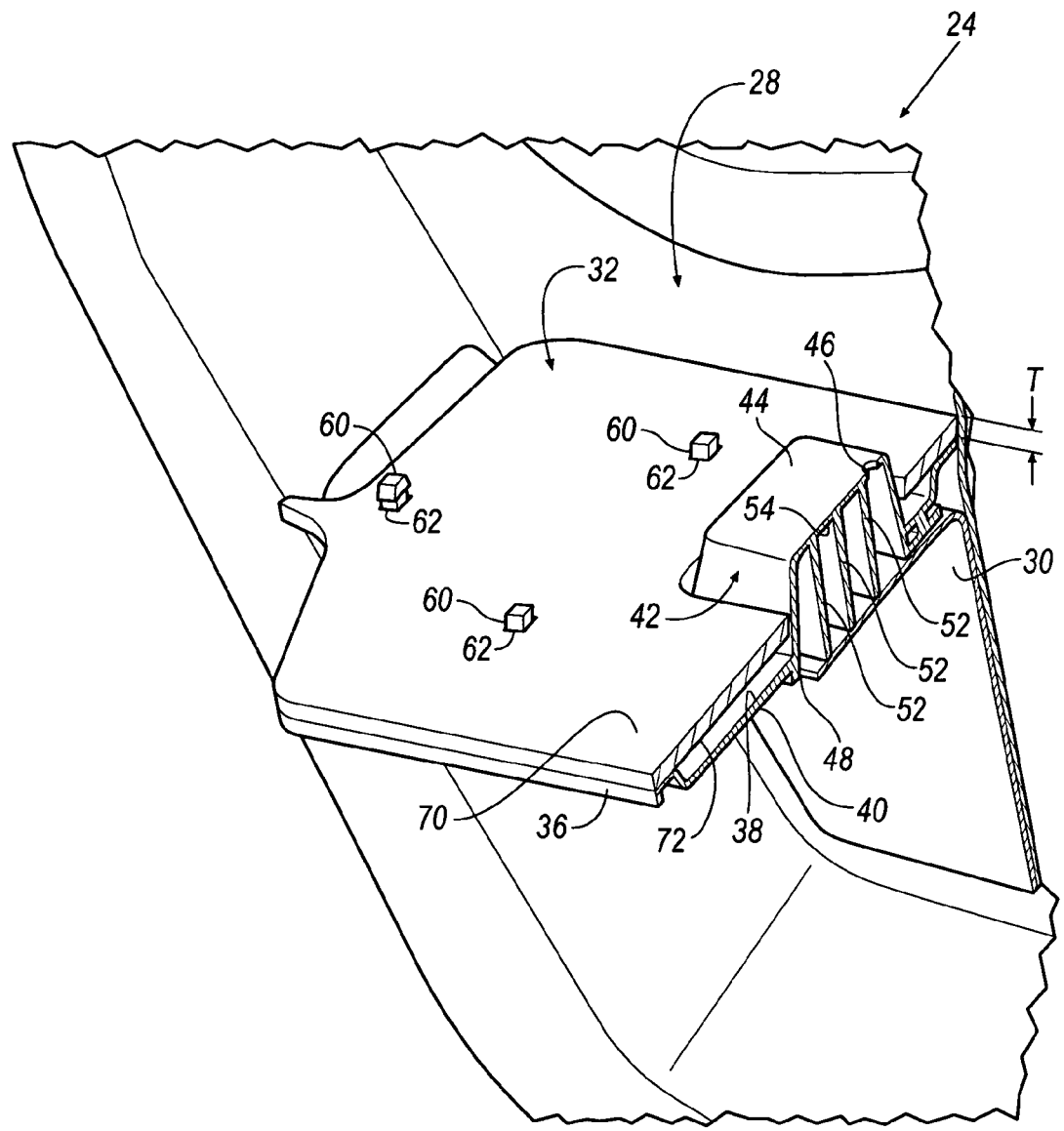
FIG. 4 is a sectional view taken along line 4-4 of FIG. 2.

An exemplary baffle assembly 28 is shown in FIGS. 2 through 7. The baffle assembly 28 includes a support element 30, a sealing material 32, and a carrier portion 36, which are configured to fit within a pillar, cavity, or other hollow space. The support element 30 is a portion of a vehicle body panel (FIGS. 4-6) that provides a structural support for carrier portion 36, as discussed below. As best seen in FIG. 4, the carrier portion 36 has an upper surface 38 and a lower surface 40. The carrier portion 36 is shaped and sized to fit snugly between the panels that define the rocker panel 24 so as to substantially prevent sound from traveling through the hollow space past the carrier portion 36. The carrier portion 36 may be made from a variety of materials, including hard plastic. The sealing material 32 is configured to cause the carrier portion 36 to adhere to and seal against the panels that define the hollow space and provide more sound dissipation, as discussed below.

The baffle assembly 28 further includes a drain housing 42 configured to permit fluid to flow therethrough and past the baffle assembly 28, while substantially preventing sound from traveling threrethrough. The drain housing 42 includes a top surface 44 with a fluid inlet 46 formed therein, a fluid outlet opening 48 adjacent the lower surface 40, and a substantially hollow cavity, which is shown generally at 50 in FIG. 3.

Figure 5:
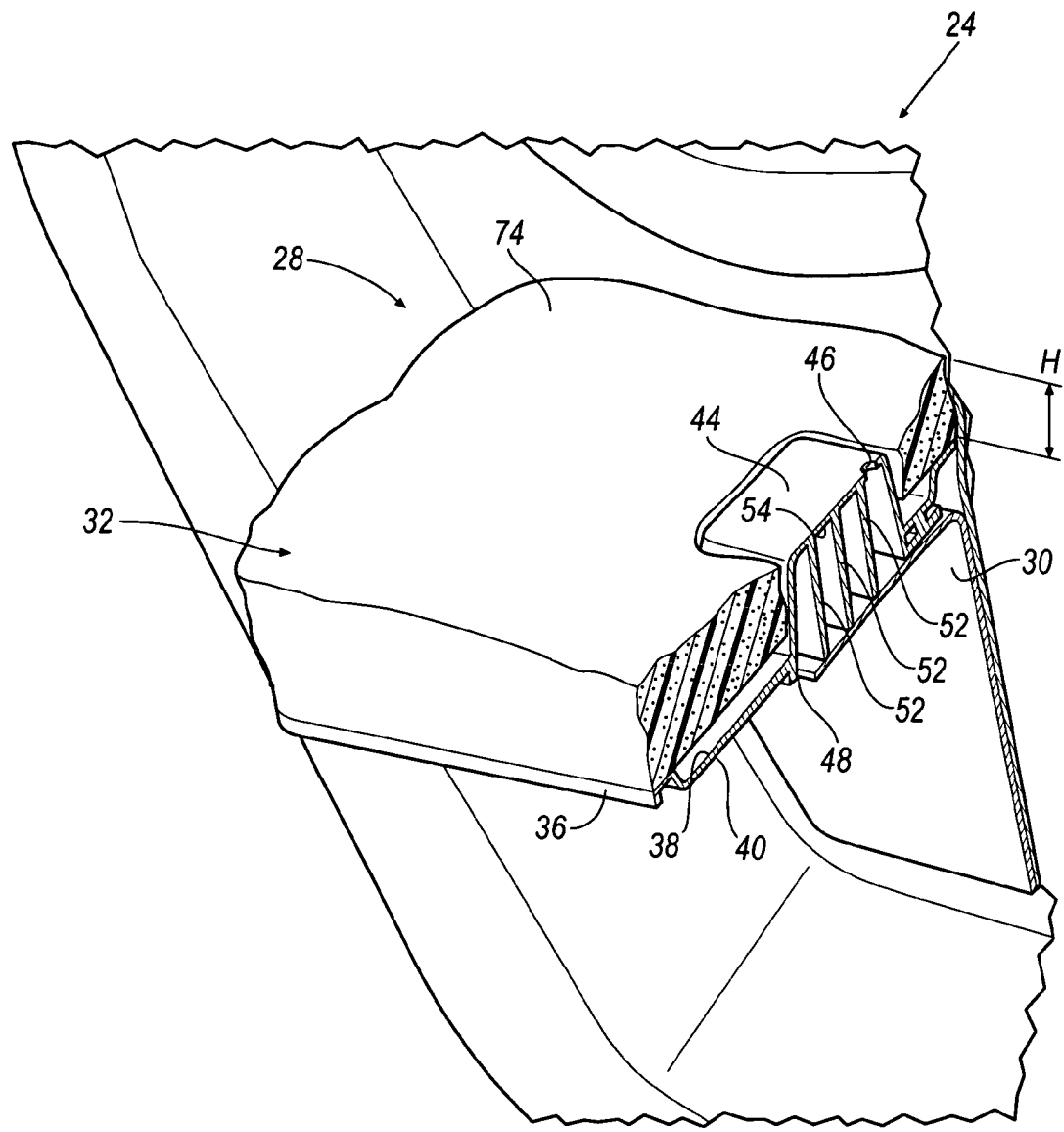
FIG. 5 is a sectional view similar to FIG. 4, illustrating the baffle assembly after the expansion of the expandable foam, with the foam slightly separated from the baffle assembly for clarity.
Figure 6:
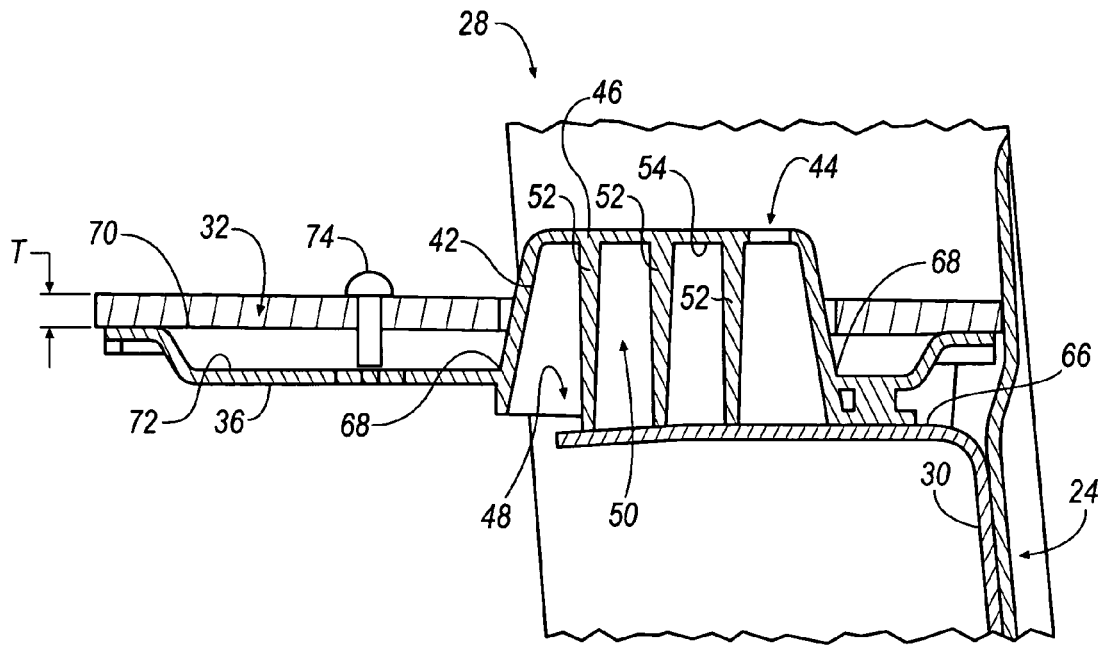
FIG. 6 is an end view of the cut-away view of the baffle assembly according to FIG. 5
Figure 7:
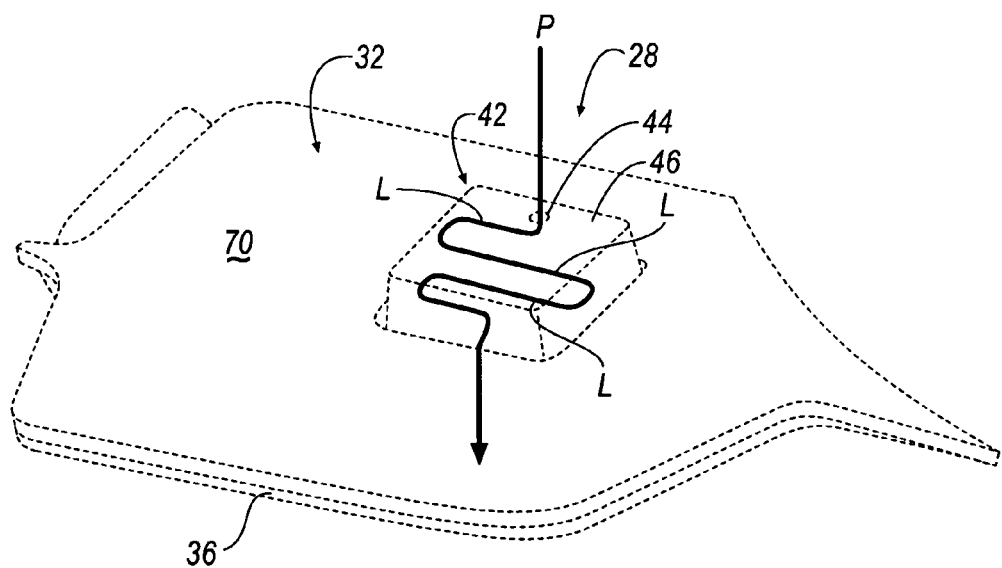
FIG. 7 is a phantom view of the baffle assembly of FIG. 2, illustrating the drain flow path.

As seen more clearly in FIGS. 3 through 7, the drain housing 42 further includes staggered web portions 52 that perpendicularly extend from an interior surface 54 of the drain housing 42. As such, the staggered web portions 52 seat against support element 30 and form the substantially hollow cavity 50 into a labyrinth that permits the flow of fluid therethrough. The cavity 50 forms a generally horizontal labyrinth drain path through drain housing 42, which is illustrated in FIG. 7 by an arrow, P. Drain path P is defined by segments L that are separated by web portions 52. As such, a fluid (not shown) that enters the fluid inlet 46 may be diverted within the drain housing 42 and flow in the direction of the arrow, P, in a generally horizontal path to the opening 48.

With reference to FIG. 4, the carrier 36 may include a plurality of bosses 60 that are received by receiving-holes 62 formed in the sealing element 32. Thus provided, carrier 36 secures sealing material 32 thereto during assembly of both baffle assembly 28 and automobile body 10.

As best seen in FIG. 6, the carrier 36 abuts an upper surface 66 of the support element 30 such that the fluid outlet opening 48 of the drain housing 42 permits fluid evacuation. Additionally, the drain housing 42 may be secured to the support element 30 by an adhesive or other suitable means.

Referring specifically to FIGS. 4 and 5, the sealing material 32 is discussed in greater detail. A preselected thickness T of sealing material 32 is located over the upper surface 38 of the carrier 36. As discussed below, sealing material 32 is expanded after installation of the baffle assembly 28 in body 10. FIG. 4 illustrates the sealing material 32 after installation in body 10 and before expansion of sealing material 32. Sealing material 32 is illustrated in FIG. 4 to include an upper surface 70, and a lower surface 72. FIG. 5 illustrates the resulting expansion of sealing material 32 wherein sealing material 32 is defined, in part, by an expanded upper surface 74 that is separated from the lower surface 72 by a height H. The original thickness T and other properties of sealing material 32, such as coefficient of expansion and baking temperature, are determined in order to provide a desired height H after expansion of sealing material 32. As illustrated, a vertical distance is provided between the fluid inlet 46 and the lower surface 72 of sealing material 32. In this manner, a vertical component of the drain housing 42 is provided such that the fluid inlet 46 will not be covered or clogged by the expansion of sealing material 32.

As can be seen in FIG. 5, moisture or liquids that collect in rocker panel 24 are directed to fluid inlet 46. Liquids may flow directly to fluid inlet 46 as expanded upper surface 74 is in a generally horizontal orientation, or may be directed to fluid inlet 46 as the automobile is operated, resulting in a recurrent tilting of expanded upper surface 74 through a generally horizontal orientation. The connection between bosses 60 and sealing material 32 will not be eliminated by the expansion of sealing material 32.

The sealing material 32 is preferably die cut into a desired shape, and includes an upper surface 70 and an opposing, lower surface 72 that are separated by a thickness, T, of the sealing material 32. The receiving-holes 62 are molded or otherwise formed in the sealing material 32. The sealing material 32 is formed of a dry, initially non-tacky material that becomes tacky upon expansion so that the sealing material 32 adheres to the rocker panel 24 when the baffle assembly 28 is heated to the activation temperature at which the sealing material 32 expands as seen in FIG. 5. An exemplary sealing material is disclosed in U.S. Pat. No. 5,266,133, to Hanley et al., which is hereby incorporated by reference in its entirety. Such a material is marketed under the name SIKALASTOMER 240 by Sika Corporation of Lyndhurst, N.J.; however, any other suitable sealing material may be employed that is able to expand sufficiently upon activation to seal the hollow cavity within which the baffle assembly 28 is positioned.

One necessary characteristic of the sealing material 32 is that the sealing material must possess an activation temperature lower than or equal to the temperature at which the automobile body is baked during manufacture. For example, it is conventional to employ a bake temperature of about 177. degree. C. (350 .degree. F.) in the manufacture of automobiles. Accordingly, the preferred sealing material for use in the manufacture of automobiles must possess an activation temperature lower than this value, e.g. 149 .degree. C. (300 .degree. F.).

Thus provided, sealing material 32 partially encloses drain housing 42 to form a tight fit of sealing material 32 adjacent the vertical outer surfaces of drain housing 42. This enclosure of drain housing 42 reduces any resonate vibrations that the drain housing 42 may propagate through a pillar 22 or rocker panel 24. In operation, vibrations that propagate upwards, due to vibrations in the automobile frame or the like, through a pillar 22 or rocker panel 24 reach the baffle assembly 28. While the baffle assembly 28 may resonate with some of the frequencies of these vibrations, the sealing material 32 dissipates these vibrations by damping carrier 36. The drain housing 42 may resonate with some of the frequencies of these vibrations, but the sealing material 32, expanded to a tight fit with drain housing 42, dampens the vibrations of drain housing 42, thereby dissipating these frequencies. Any vibrations that enter fluid outlet opening 48 are reduced in magnitude as they follow drain path P by deflecting on the web portions 52 and other interior vertical surfaces of drain housing 42. Again, any vibrations that may be induced into web portions 52 or drain housing 42 by vibrations that enter fluid outlet opening 48 are dissipated as described above with respect to drain housing 42. An exemplary torturous path for sound dissipation is disclosed in U.S. Pat. No. 5,295,785, the disclosure of which is herein incorporated by reference in its entirety.

The carrier 36 is formed of a material having a melting point that is higher than both the activation temperature of the sealing material 32 and the bake temperature to which the automobile body is to be exposed. Preferably, the temperature at which the material of the carrier 36 softens is also above the bake temperature. Thus, the carrier 36 is able to substantially maintain its shape before, during and after the baking operation, to support the 42 so that the sealing material 32 expands tightly fill a portion of the pillar 22 or rocker panel 24.

The carrier 36 is formed of a moldable material that is pliable so that special handling of the baffle assembly 28 is not required where applied bending forces would otherwise cause cracking or other permanent deformations. An exemplary material of the carrier 36 is a black, heat stabilized, lubricated 33% glass-reinforced 66-nylon having a heat deflection temperature at 1.8 MPa of 240 .degree. C. (464 .degree. F.), and a melting point of 262 .degree. C. (504 .degree. F.). Such a material is marketed as NYLIND 51HSL BK001 by DuPont. However, other similar materials may be used depending upon the desired physical characteristics thereof.

The carrier 36 and drain housings 42 are preferably formed of a material having a melting point that is higher than both the activation temperature of the sealing material 32 and the bake temperature to which the automobile body is to be exposed. Preferably, the temperature at which the material of the drain housings 42 softens is also above the bake temperature. Thus, the drain housings 42 are able to substantially maintain their shape before, during and after the baking operation. As shown in FIGS. 3-6, the drain housings 42 and carrier 36 are preferably formed as a unitary piece of the same moldable material.

Accordingly, during assembly of the automobile, the acoustic baffle assembly 28 is inserted into the pillar 22 of the automobile body 10 and remains in place during subsequent assembly operations. Any fluid that collects in the pillar 22 during assembly, washing, pre-preparation, or priming may be drained. When the automobile is subjected to a bake temperature, typically of about 177° C. (approximately 350° F.), the sealing material 32 is activated and expands as described herein and illustrated in FIGS. 4 and 5. Subsequent to manufacture, the acoustic baffle assembly 28 effectively serves as a baffle for muting sounds that would otherwise be transmitted through the pillar 22. Concurrently, water or other fluids that encounter the baffle assembly 28 may be drained through the cavity 50. As such, the baffle assembly 28 permits passage of fluids therethrough while presenting an acoustic baffle structure that mutes noise transmitted through the hollow cavities of body 10. Thus, the baffle assembly 28 achieves two functions by allowing fluid drainage while functioning as a muting component.

While the present invention has been particularly shown and described with reference to the foregoing preferred and alternative embodiments, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

The invention claimed is:

1. A baffle assembly, comprising:
 a substantially planar carrier having an upper surface and a lower surface; and
 a drain housing extending upwardly from said upper surface, wherein said drain housing includes a cavity interconnecting a fluid inlet and a fluid outlet, and a generally vertically oriented web portion that extends from an interior surface of the drain housing to define at least a portion of a drain path through said cavity,
 wherein said drain housing includes a plurality of staggered web portions that extend from an interior surface of said drain housing to define a labyrinth drain path, and wherein the labyrinth drain path is defined by a labyrinth drain path portion and a generally vertical portion, and wherein the entire labyrinth drain path portion is oriented parallel to a generally horizontal plane.

2. The assembly of claim 1, wherein at least a portion of said cavity defines at least a portion of the labyrinth drain path.

3. The assembly of claim 2, wherein said labyrinth drain path is located above said upper surface.

4. The assembly of claim 1, wherein said at least a portion of a drain path is oriented parallel to a generally horizontal plane.

5. The assembly of claim 4, wherein no portion of said at least a portion of a drain path is located below the carrier.

6. The assembly of claim 1, wherein said web portion defines two legs of said drain path, wherein said two legs of said drain path flow in opposite directions.

7. The assembly of claim 1, wherein said fluid outlet is formed in said carrier.

8. A drain housing for dissipating sound therein, comprising:
 a generally vertically oriented planar web portion that extends from an interior surface of said drain housing to define at least a portion of a drain path through said drain housing, wherein said web portion defines two legs of said drain path, wherein said two legs of said drain path flow in opposite directions,
 wherein said drain housing includes a plurality of staggered web portions that extend from an interior surface of said drain housing to define a labyrinth drain path. and wherein the labyrinth drain path is defined by a labyrinth drain path portion and a generally vertical portion, and wherein the entire labyrinth drain path portion is oriented parallel to a generally horizontal plane.

9. The drain housing of claim 8, further comprising a lower interior surface, wherein said at least a portion of a drain path is defined, at least in part, by said lower interior surface.

10. The assembly of claim 1, wherein the entire labyrinth drain path portion is in contact with lower interior surface of the drain housing.

11. The drain housing of claim 8, further comprising a lower interior surface, wherein the entire labyrinth drain path portion is in contact with lower interior surface.

* * * * *